(12) United States Patent
Nordquist et al.

(10) Patent No.: US 12,075,152 B2
(45) Date of Patent: Aug. 27, 2024

(54) COMPUTER-ASSISTED CAMERA AND CONTROL SYSTEM

(71) Applicant: Advanced Image Robotics, Inc., San Diego, CA (US)

(72) Inventors: Nick Nordquist, La Jolla, CA (US); Jeff Debrosse, La Jolla, CA (US); Eyal Rubin, La Jolla, CA (US)

(73) Assignee: ADVANCED IMAGE ROBOTICS, INC., San Diego, CA (US)

( * ) Notice: Subject to any disclaimer, the term of this patent is extended or adjusted under 35 U.S.C. 154(b) by 24 days.

(21) Appl. No.: 17/914,716

(22) PCT Filed: Mar. 29, 2021

(86) PCT No.: PCT/US2021/024742
§ 371 (c)(1),
(2) Date: Sep. 26, 2022

(87) PCT Pub. No.: WO2021/195641
PCT Pub. Date: Sep. 30, 2021

(65) Prior Publication Data
US 2023/0353861 A1     Nov. 2, 2023

Related U.S. Application Data

(60) Provisional application No. 63/001,028, filed on Mar. 27, 2020.

(51) Int. Cl.
*H04N 23/62*     (2023.01)
*H04N 23/63*     (2023.01)
(Continued)

(52) U.S. Cl.
CPC .......... *H04N 23/62* (2023.01); *H04N 23/631* (2023.01); *H04N 23/661* (2023.01); *H04N 23/695* (2023.01)

(58) Field of Classification Search
CPC .... H04N 23/62; H04N 23/631; H04N 23/661; H04N 23/695; H04N 23/685;
(Continued)

(56) References Cited

U.S. PATENT DOCUMENTS 5,959,667 A    9/1999    Maeng
9,030,149 B1 *   5/2015    Chen .................... F16M 11/123
                                        318/648
(Continued)

FOREIGN PATENT DOCUMENTS

WO     2019061349 A1     4/2019

OTHER PUBLICATIONS

International Search Report and Written Opinion, PCT/US2021/024742 Jul. 7, 2021, 8 pages.

*Primary Examiner* — Timothy J Henn
(74) *Attorney, Agent, or Firm* — Eleanor Musick; TORREY PINES LAW GROUP PC

(57) ABSTRACT

A lightweight portable microprocessor-assisted remote control camera system provides precise repeatable camera movement through the improved stability of a 3-axis gimbal design, which allows a lightweight large sensor camera to be placed almost anywhere and smoothly controlled remotely via a simple touchscreen interface. The computer control module provides a wide range of control options including remote adjustment of all camera, lens and gimbal parameters, which can be programmed, set and recalled, including stabilization and motion smoothing, via the touchscreen interface.

20 Claims, 10 Drawing Sheets

(51) Int. Cl.
*H04N 23/661* (2023.01)
*H04N 23/695* (2023.01)

(58) Field of Classification Search
CPC .... H04N 23/69; F16M 11/048; F16M 11/205; F16M 2200/041; F16M 2200/044; F16M 11/10; F16M 11/123; F16M 11/2071; F16M 11/18; G03B 15/02; G03B 17/561
See application file for complete search history.

(56) References Cited

U.S. PATENT DOCUMENTS

| | | |
|---|---|---|
| 9,329,703 B2 | 5/2016 | Falkenburg et al. |
| 9,900,551 B2 | 2/2018 | Rekimto |
| 10,274,129 B2 | 4/2019 | Saika et al. |
| 10,914,419 B2 | 2/2021 | Saika et al. |
| 11,143,836 B2 | 10/2021 | Matsunaga et al. |
| 2003/0193562 A1* | 10/2003 | Corzillus ......... G08B 13/19691 348/E7.086 |
| 2012/0098927 A1 | 4/2012 | Sablak |
| 2017/0075351 A1* | 3/2017 | Liu ....................... B64U 10/14 |
| 2017/0131623 A1* | 5/2017 | Zhou ................... F16M 11/045 |
| 2017/0175949 A1* | 6/2017 | Cardozo ................. F16H 19/04 |
| 2017/0227162 A1 | 8/2017 | Saika et al. |
| 2017/0248948 A1* | 8/2017 | Otani ..................... H04N 23/63 |
| 2018/0101173 A1 | 4/2018 | Banerjee et al. |
| 2018/0204331 A1* | 7/2018 | Omari ..................... B64D 47/08 |
| 2018/0295327 A1 | 10/2018 | Yearwood |
| 2019/0042004 A1 | 2/2019 | Parazynski et al. |
| 2019/0137597 A1 | 5/2019 | Glover et al. |
| 2019/0267868 A1 | 8/2019 | David |
| 2019/0285824 A1 | 9/2019 | Matsunaga et al. |
| 2019/0302443 A1* | 10/2019 | Garrison ............. G03B 17/566 |
| 2020/0218137 A1 | 7/2020 | Huang et al. |
| 2021/0148508 A1 | 5/2021 | Saika et al. |

\* cited by examiner

COMPUTER-ASSISTED CAMERA AND CONTROL SYSTEM

RELATED APPLICATIONS

This application is a 371 national stage filing of International Application No. PCT/US2021/024742, filed Mar. 29, 2021, which claims the benefit of the priority of U.S. application Ser. No. 63/001,028, filed Mar. 27, 2020, each of which is incorporated herein by reference in its entirety.

FIELD OF THE INVENTION

The present invention relates to a remote control camera system and more particularly to a camera platform with 3-axis stabilization and control via a touchscreen interface and precision movement control.

BACKGROUND

Video recording of public activities and sporting events is commonplace for entertainment and education/training purposes. Entire industries are dedicated to the filming of professional and amateur athletic contests, public performances, and other events using sophisticated camera equipment handled by professionals. Such camera equipment tends to be costly and requires specialized training to achieve the quality result needed for televised sporting events or concerts. For video recording of activities that do not typically generate revenue, for example, youth athletic leagues and tournaments, surfing competitions, and non-public athletic practices, there is interest in the ability to create high quality video of the activities for personal entertainment as well as for use in training and coaching. Other activities for which economical video capability is often desirable include corporate events and conventions, theatrical or musical performances, weddings and parties, and public festivals. Unfortunately, without the significant financial resources of a for-profit entertainment business, the video capabilities available for smaller scale events are often less than ideal due to the limitations in both the equipment quality and placement.

Considerable effort has been put into the development of unmanned aerial vehicles (UAV), or drones, for capturing images (including video) from the air. A number of UAV systems are currently available that provide for image and video capture and remote control from a device on the ground. However, use of drones can be restricted in many situations pursuant to FAA rules and/or local ordinances. Further, currently available systems require piloting using direct control of the UAV similar to other fixed wing or rotor craft. Control of these drones to adjust the pitch, roll, yaw, and power of the UAV, for example, rely on common control inputs such as a joystick and throttle control. While effective to a degree, such control systems require expertise on the part of the remote pilot and are prone to crashes due to pilot error. The risk of crashing is further exacerbated by the pilot's tendency to focus on what they are seeing on a monitor screen to follow the action on the field. Popular commercial UAVs are typically designed to communicate remotely with a smart phone or tablet to allow the pilot to see what the camera is seeing, however, the wireless communication system can be interrupted and/or subject to delays, with potentially catastrophic results for the UAV.

Solutions to a few of the issues encountered with video capture systems have been described in the prior art. For example, U.S. Pat. No. 9,900,551 of Rekimto discloses a communication terminal for video conferencing with camera control and image processing. This system is suitable for mounting on a stable base, such as a table, but does not provide control at a distance, and requires time-consuming adjustments to ensure leveling. US Patent Publ. 2019/0137597 of Glover et al., describes a system and method for automatically orienting a camera that relies on a transceiver worn by a subject to communicate with the camera to cause the camera's processor to track the subject and adjust focal distance. While this approach may be useful for a single or small number of subjects, tracking an entire team with a large number of transceivers could become challenging from many perspectives, not the least of which is the computational demand involved in managing real time interaction with so many targets. U.S. Pat. No. 5,959,667 of Maeng discloses a voice activated camera system that includes software to automatically track who is speaking. The disclosure of each of the identified patent documents is incorporated herein by reference.

While the described approaches may address a few of the difficulties encountered in creating a quality video, none provide a system capable of the desired performance in an affordable, user-friendly package for a versatile video recording of events. Accordingly, the need remains for such a system.

SUMMARY

According to embodiments of the invention, a lightweight portable microprocessor-assisted remote control camera system provides precise repeatable camera movement that heretofore has been difficult or impossible to accomplish any other way. The improved stability of the system's gimbal design allows a lightweight large sensor camera to be placed almost anywhere and smoothly controlled remotely via a simple touchscreen interface. All camera and lens parameters can be set and recalled and movement smoothed/improved via electronic microprocessor control. The inventive robotic camera effectively allows an amateur to shoot like a professional.

In an exemplary embodiment, the inventive system enables mounting, stabilizing, and controlling image capture technology from a distance. The system includes a high-resolution camera with a lens, a 3-axis gimbal, a control module, a camera platform, a power supply, a wireless or wired connection path (either direct point-to-point or connection via a Local Area Network or Wide Area Network), optional lens control servos, and a touchscreen device or other user interface. For wireless connection, WiFi, a cellular network connection, e.g., 5G, may be used. For wired connection, alternatives include serial or parallel control (digital or analog) and/or high-speed mixed signal. In some embodiments, a web-based interface may be used for control and monitoring via any web connected device.

The lens mounts to a camera with optional lens-attached zoom/focus servo accessories. The camera is supported by a 3-axis gimbal via a novel balance adjustable mounting apparatus. The gimbal and camera are connected to a control module (a/k/a, "AIRstation"). The AIRstation functions as an Ethernet distribution point, Ethernet to serial control bridge(s), and power distribution to all system components. The gimbal and AIRstation are supported on a camera platform, which may be a pole, tripod, monopod, robotic arm, slider, jib arm, fixed mount, ground based vehicle, or other device. The AIRstation is wired to a power source, either a battery pack or AC converter, which provides power for all system components. The system combines camera control, lens control (zoom, focus, aperture), camera angle (pan, tilt and roll), and camera position (XYZ axes in 3D space) into one touchscreen interface. The apparatus integrates Ethernet routing/bridging, video & audio input and output, serial control, and power distribution into one device that is controllable by a tablet/computer either via wireless (e.g., cellular or WiFi) and/or wired connection, which may be configured as an override feature.

A tablet/computer can connect into the system via any hardwired Ethernet point, wirelessly, or can control an individual system component via a direct point-to-point connection. The tablet/computer provides a user interface that can be operated via touchscreen, user voice audio, and/or an external accessory control device. The tablet/computer control connection can be either direct point-to-point or networked via a Local Area Network (LAN), Wide Area Network (WAN), or wireless (e.g., WiFi or cellular) connection. For wired connection, alternatives include serial or parallel control (digital or analog) and/or high-speed mixed signal.

The lens can be controlled through camera lens mount connection or via externally mounted servo motors affixed to the lens. Control of externally mounted servos can be either via the camera, the AIRstation serial connection(s), or direct wireless connection to the tablet/computer or accessory device.

Additional movement of the camera platform, e.g., a robotic arm or mobile camera platform can also be controlled through the tablet/computer user interface.

A software implementation is included for integrated visual (in addition to numerical) programming of camera, lens zoom, focus, and aperture control, pan/tilt positioning, and camera X/Y/Z position in 3D space. All camera and lens settings, as well camera position and direction in 3D space, are set via a simple What-You-See-Is-What-You-Get ("WYSIWYG") interface. Set positions can be recalled and smoothly transitioned between using a simple tap on the touchscreen or other user interface. Multiple settings can be transitioned between simultaneously, for example, pan and tilt direction and camera zoom and focus can all be adjusted simultaneously, as can the position of a robotic platform on which the camera and gimbal are supported.

A key improvement provided by the inventive camera system is a 3-axis gimbal that allows for quick, precise balance readjustment with lens changes. The gimbal design allows the camera/lens assembly to be pre-balanced and centered such that lens changes and other modifications require minimal rebalancing efforts. Center of gravity balancing of the camera and lens is maintained through the use of dual slide mechanisms. The 3-axis gimbal may be used to adjust both vertical and horizontal axes as well as providing self-leveling so that if the entire setup is moved, or located upon a platform that moves, it retains a level horizon. The gimbal may also be servo controlled and connected to an Inertial Measurement Unit (IMU) in the camera assembly for automatic balance adjustment. The IMU may incorporate a gyroscope, accelerometer, magnetometer, or any combination thereof.

Optional features may include using an Apple® pencil-like device (see, e.g., U.S. Pat. No. 9,329,703, incorporated herein by reference) or similar stylus for enhanced control, with an optional zoom rocker switch or slide integrated into the pencil, allowing for variable speed dynamic control of touchscreen functions. This feature provides the significant advantage of allowing single hand control of pan/tilt as well as zoom functions. In comparison, alternatives such as joysticks that integrate a twist-to-zoom function tend to be difficult to operate smoothly.

Additional features may include a distance transmitter for focus assist and pan/tilt control. In one implementation, a dog tag-like necklace, clip-on device, or other transmitter may be worn by a subject/participant in an activity to transmit distance and/or direction data to a receiver that has been calibrated with the camera focal plane. The camera can then use the transmitted data to precisely adjust focal distance and follow for the tracked subject. Alternatively, the transceiver may be incorporated into a Fitbit® or Apple® watch-type personal smart device, or an application may be included in the system software to communicate with the built-in tracking functions of such devices, allowing the camera system for follow the subject and automatically adjust the camera settings as needed. Similarly, a smart phone may be used as the transceiver-tracking device for providing feedback to control focus, pan and/or tilt. For added interest, trackers or sensors may also be incorporated into game balls to follow ball movement automatically with the camera.

In one aspect of the invention, a remote control camera system includes a high resolution camera configured for generating digital images and data corresponding to image-related parameters detected by sensors associated with the camera; a lens removably and replaceably attached to the camera; a 3-axis gimbal configured for supporting and modifying one or more of pan, tilt and roll of the camera; a camera platform configured for supporting the gimbal; a control module configured for receiving the digital images and image-related parameters generated by the camera, for processing the image-related parameters to generate image information associated with the digital images, and for generating control signals to each of the camera and gimbal; a communications path; and a user interface in communication with the control module via the communications path, the user interface configured for displaying the digital images and the image information associated with the digital images, and for entry of user commands for causing the control module to activate control signals to execute operations of one or more of the camera and the gimbal. In some embodiments, the camera platform may be one or more of a tripod, a monopod, a slider, a jib arm, a robotic arm, a ground-based vehicle and a wall mount. If the camera platform is a robotic arm, the control module is further configured to generate control signals for manipulation of the robotic arm. If the camera platform is a ground-based vehicle, the control module may be further configured to generate control signals for manipulation of the ground-based vehicle. The communications path may be a wireless or wired connection path.

The gimbal may include a z-axis motion assembly symmetrically disposed on opposite sides of the camera, so that activation of the z-axis motion assembly provides forward/backward adjustment of a combination of the camera and lens. The z-axis motion assembly may be a dual rack-and-pinion assembly, where a pinion of each rack-and-pinion assembly is connected to each of a left side and a right side of the camera, and wherein each pinion is connected to a shaft for synchronous movement. A rack of each rack-and-pinion assembly is supported on ends of a U-arm, wherein the camera is symmetrically centered between the ends of the U-arm. A first end of the U-arm supports a tilt motor and a second end of the U-arm supports a corresponding bearing, wherein activation of the tilt motor tilts the camera relative to the U-arm. The base of the U-arm comprises a roll motor.

The image information associated with the digital images includes one or a combination of lens data, focal length, focus distance, exposure, aperture, tint, flicker reduction, shutter angle/speed, image profile, sharpness, brightness, saturation, contrast, luminance, LUT, white balance, ISO, and audio level, and wherein the control module is configured to generate an interactive display of the image information on the user interface; and in response to entry of user commands via the user interface, activate control signals to execute operations of one or more of the camera and the gimbal to adjust one or more of the image-related parameters. The control module is further configured to a network for communicating the digital images and image information to a storage medium.

The gimbal may be configured to generate signals corresponding to gimbal-related parameters, and the control module is further configured to receive the gimbal-related parameters and associate the gimbal-related parameters with the image information.

The system may further include one or more depth sensors for determining a distance between a subject of interest and a focal plane of the camera and generating a depth signal, wherein the control module receives and processes the depth signal to generate depth information associated with the image information. The depth information is processed by the control module to generate tracking commands to one or more of the camera, lens, and gimbal to track motion of the subject of interest. The depth information may also be used to generate a depth map from the digital image.

The control module may be configured to control movement of the camera and gimbal to smooth transitions between two different points within a field of view, and may be further configured to obtain lens focal length information from the camera to dynamically change a degree of pan/tilt/roll travel based upon the focal length.

In some embodiments, the user interface is a touchscreen device, wherein the user controls camera pan and tilt by touching a portion of the image at which a subject of interest is located and following movement of the subject of interest.

The system may further include a transmitter/receiver system, wherein a transmitter disposed on a subject of interest generates a signal to the control module to provide depth information to assist with focus and pan/tilt control.

DETAILED DESCRIPTION OF EMBODIMENTS

Figure 1:
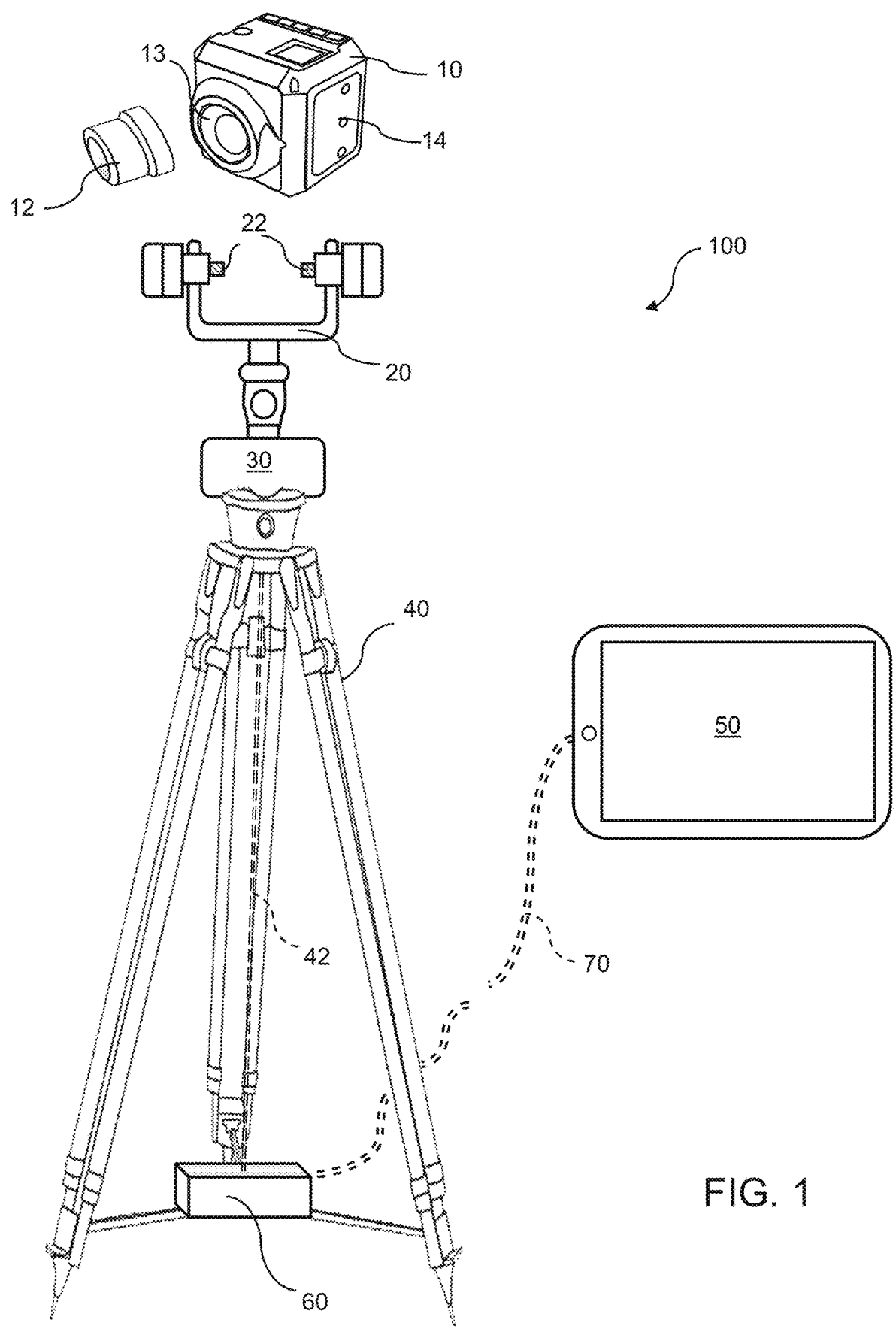
FIG. 1 is a diagram of the primary components of an embodiment of the inventive camera system.
Figure 2A:
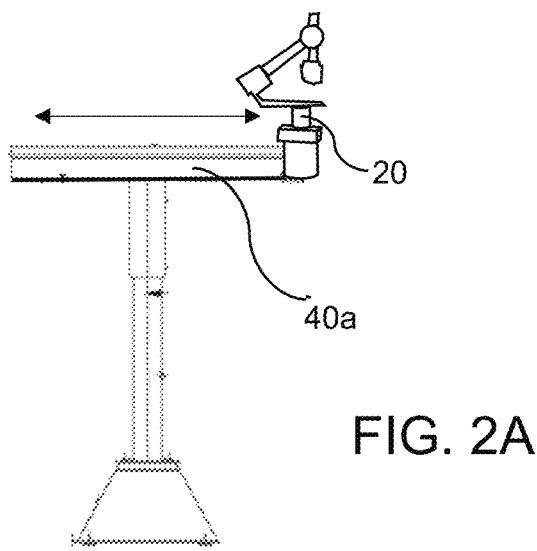
FIGS. 2A-2D are diagrams of alternative mounting options for use with the inventive camera system.
Figure 2B:
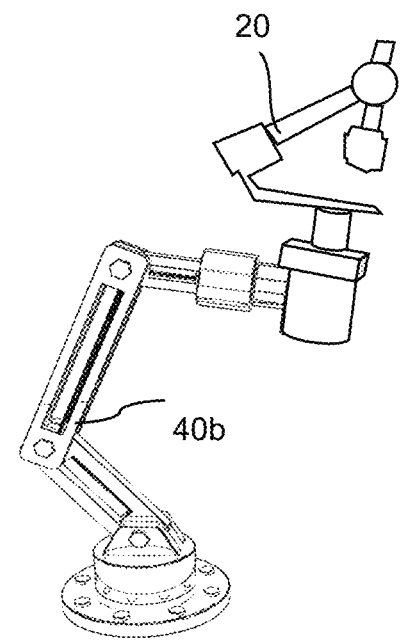
Figure 2C:
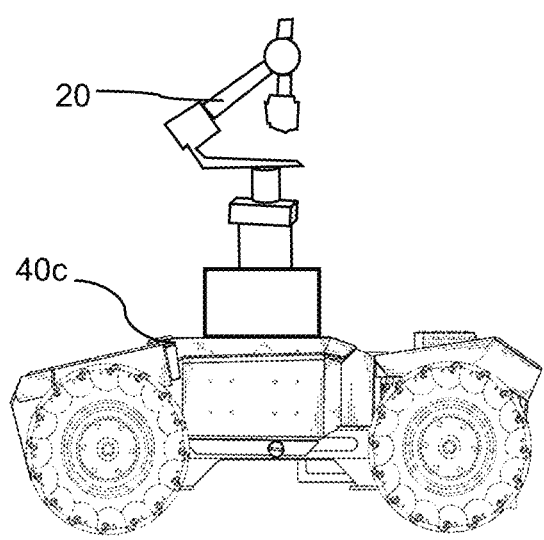
Figure 2D:
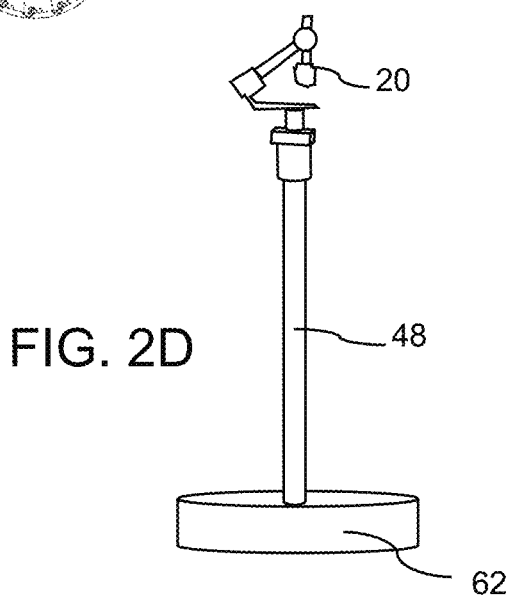

Referring to FIG. 1, the inventive camera system 100 includes five primary components: a high-resolution camera 10, a 3-axis gimbal 20, a control module 30, camera platform 40, and a user interface 50. The camera platform 40 may take a number of different forms, as are known in the art. In FIG. 1, the camera platform 40 shown is a conventional tripod. A monopod or similar convention camera support may be used. Referring briefly to FIGS. 2A-2C, examples of options that can be used as a camera platform include a slider or jib arm 40*a* (FIG. 2A), a robotic arm 40*b* (FIG. 2B), a ground-based vehicle 40*c* (FIG. 2C), or a combination of multiple supports, e.g., a robotic arm on a robotic vehicle. Additional options include a wall mount or other camera support. In one embodiment, a tripod such as that shown in FIG. 1 can be attached to and extend upward from a chair, allowing a person sitting on the chair to act as human counterweight. Alternatively, a folding seat can extend from the base of the tripod Returning again to FIG. 1, positioned nearby, incorporated into, or attached to the camera platform 40 is a power supply 60, such as a battery pack, AC/DC converter module, generator, or other power source, preferably positioned to provide a low center of gravity and counterbalance to the camera and gimbal. In some embodiments, the power supply 60 may be retained within a base 62, which, combined with shaft/pole 48 as shown in FIG. 2D, which may include telescoping capability, serves as the camera platform. In another implementation, the power supply can be incorporated into a monopod at its lower end for low center of gravity. This configuration can be further combined with the above-described human counterweight approach, with the chair attached at the lower end of the shaft or monopod, or a chair that has a receptacle for receiving the lower end of the shaft or monopod.

Connector cable 42 between the power supply 40 and the control module may be enclosed within the hollow center of a tripod, as shown, or may be exterior to the shaft, preferably with appropriate stabilization via cable ties or other cable control to ensure centering of any objects that might impact on the assembly's balance or present a risk of inadvertent contact. Bundled with connector cable 42 can be a wired connection path, providing either direct point-to-point or connection via a Local Area Network, a Wide Area Network, or other wired connected to an external controller, e.g., user interface 50.

Alternatively, a wireless connection, e.g., WiFi, 5G mobile, may be used. In some embodiments, a Gigabit Ethernet (GigE) cable is used.

In an exemplary embodiment, camera 20 is a commercially available high-resolution camera such as those in the Z CAM product line of compact high-resolution cinema cameras (Z Cam, Shenzhen, China). As will be apparent to those in the art, other cameras may be used in the inventive system including commercially-available cameras such as the Blackmagic Pocket Cinema Camera (BMPCC), Komodo, GoPro®, Panasonic BGH1, and more. The camera includes a mounting for interchangeable lenses 12 as well as electronics and motors for control of lens focus and zoom. Exemplary cameras include ports for interfacing via multiple connection protocols, including HDMI (video output), Gigabit Ethernet (camera control, setting and live streaming), USB (camera control and data transformation), XLR audio-in/out, 3.5 mm audio in/out, COM, RS232, remote, WiFi antenna, I/O, and more. These examples are not intended to be limiting. It will be apparent to those in the art that other connector types and protocols may be selected to match the specifications of different camera manufacturers.

Traditional gimbals require adjustment across 4 to 5 different axes to achieve proper payload balance. Precise balance needs to be achieved to minimize strain on the motors and drain on the batteries. Payload needs to be balanced when the camera is first mounted as well as any time a lens is changed or peripheral equipment is mounted that changes the payload center of gravity. When a change is made on a traditional gimbal it can take from 5 to 30 minutes to adjust the various sliders and locks to bring the gimbal into proper balance. Most gimbals put the camera mount plate underneath the camera. The inventive design utilizes a unique side mount approach that ensures that the camera payload (the camera/lens combination) is always naturally centered vertically and laterally. No vertical (up/down in FIG. 3A) or lateral (left to right in FIG. 3A) adjustments are necessary when changes are made to the payload, for example, by a lens change. When a change is made, only horizontal adjustments, i.e., shifting of line 110 forward or back (FIGS. 3B, 3C), are needed to compensate for a payload center of balance change.

Figure 3A:
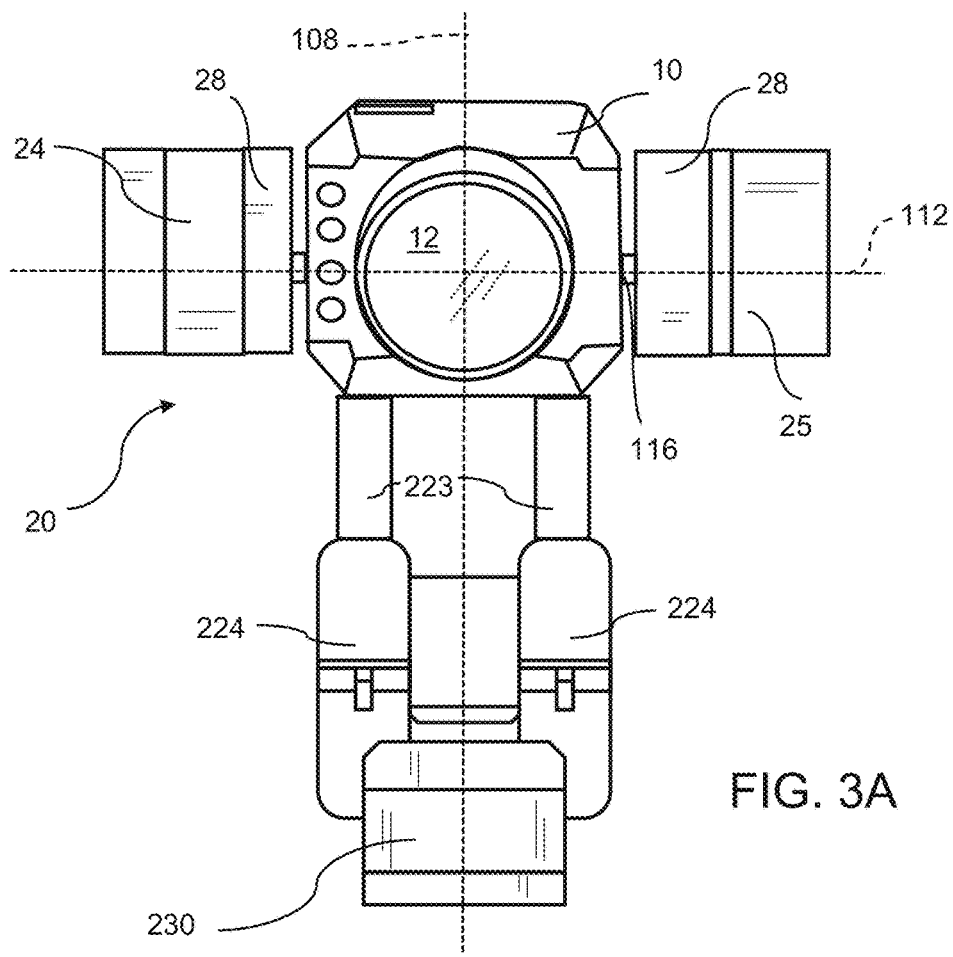
FIG. 3A-3C are front, side and top views of the 3-axis gimble according to an embodiment of the inventive camera system.

The use of side mounts as opposed to the traditional undermount is what removes the need for vertical adjustment (up/down in FIG. 3A). The evenly weighted U-arm 22 is what removes the need for lateral adjustment, i.e., left or right in FIG. 3C. A traditional undermount, by its nature, positions the camera/lens asymmetrically relative to the horizontal axis so rebalancing is always required even when a small change is implemented.

The 3-axis gimbal used in the inventive system represents important improvements over the existing technology. Camera 10 mounts to 3-axis gimbal 20 to provide enhanced control, balance and response. The inventive 3-axis gimbal enables adjustment across one axis in seconds. This is achieved by a mounting system that places the camera and lens in a natural gravitational center by way of a number of distinct elements.

A first element of the improved gimbal involves the use of side mounts for the camera body. Commercial cameras of the type contemplated for use in the inventive system include standard sized threaded bores at multiple locations on the camera body. Typically, bores on the bottom of the camera are screwed onto the threaded mount of a tripod head or other camera support. Referring briefly to FIG. 1, standard threaded mounting holes 14 are shown in the side of the camera but may also be located on the bottom and back as well. In the inventive system, side mounting is used in most embodiments. For cameras without side mounting holes natively, a camera cage or bracket that encapsulates the camera body can provide appropriate mounting holes.

Figure 3B:
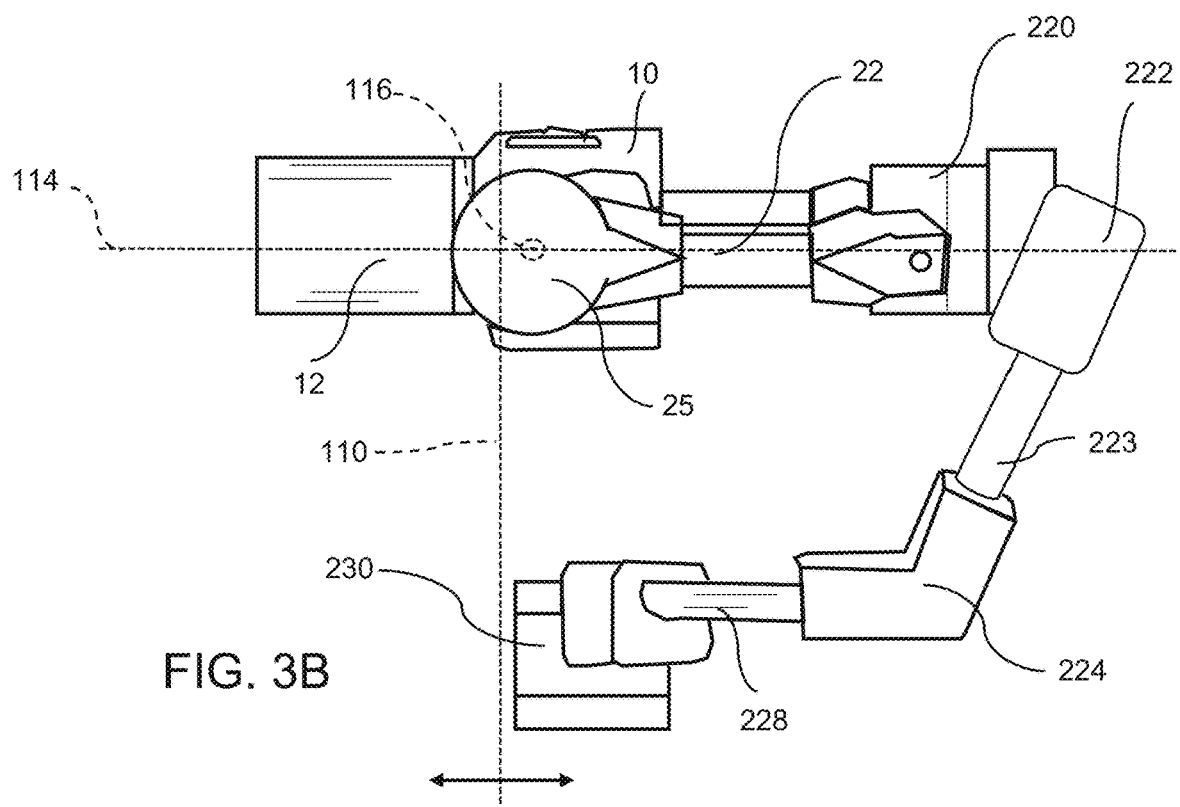
Figure 3C:
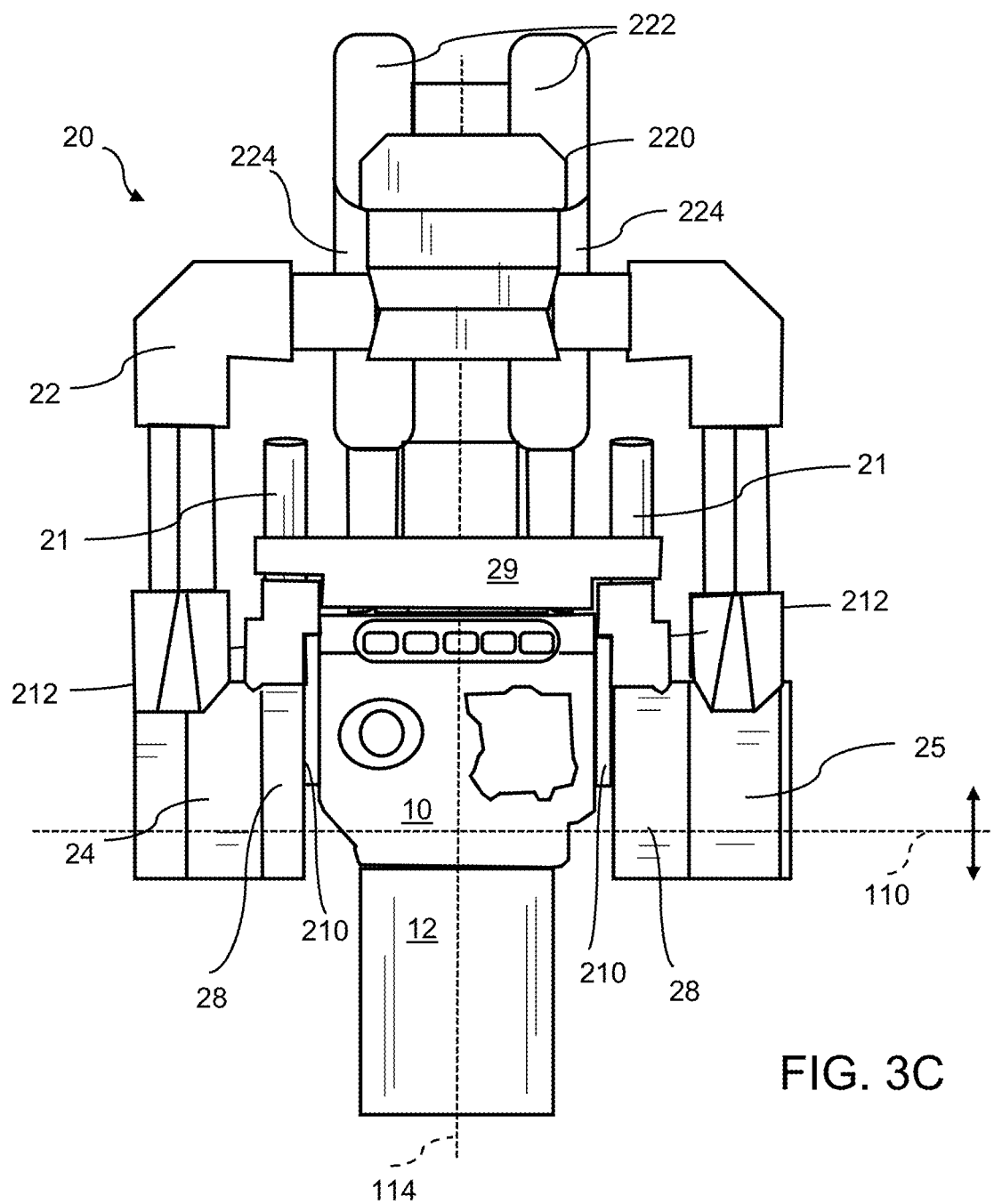

Referring to FIGS. 3A-3C, the camera is centered between the ends of U-arm 22. Looking at FIG. 3C, U-arm 22 has on its left-hand side a tilt motor 24, which powers tilt adjustment of the camera. Motor 24 is activated to rotate the camera and lens around axle 116 relative to U-arm 22. The motor provides feedback signals which are provided to the control module to indicate its position. A corresponding bearing 25 on the right-hand side of the U-arm ensures smooth rotation. Disposed between the motor 24 and bearing 25 and the sides of the camera 10 are the z-axis motion assemblies, through which the camera/lens combination is balanced relative to centerline 110. In one embodiment, these assemblies include a dual rack-and-pinion combination. Each rack-and-pinion assembly includes a mounting plate 210 that attaches to the side of camera 10 and connects at a right angle to rack guide housing 212. (Note that mounting plate 210 and housing 212 may be integrated into a single part.) A pinion gear (not shown in FIG. 3C) attached to back plate 29 engages with the teeth on rack 21 to move the camera backward and forward relative to axis 110, allowing precise balancing of the camera 10/lens 12 combination within the overall gimbal assembly.

Figure 4:
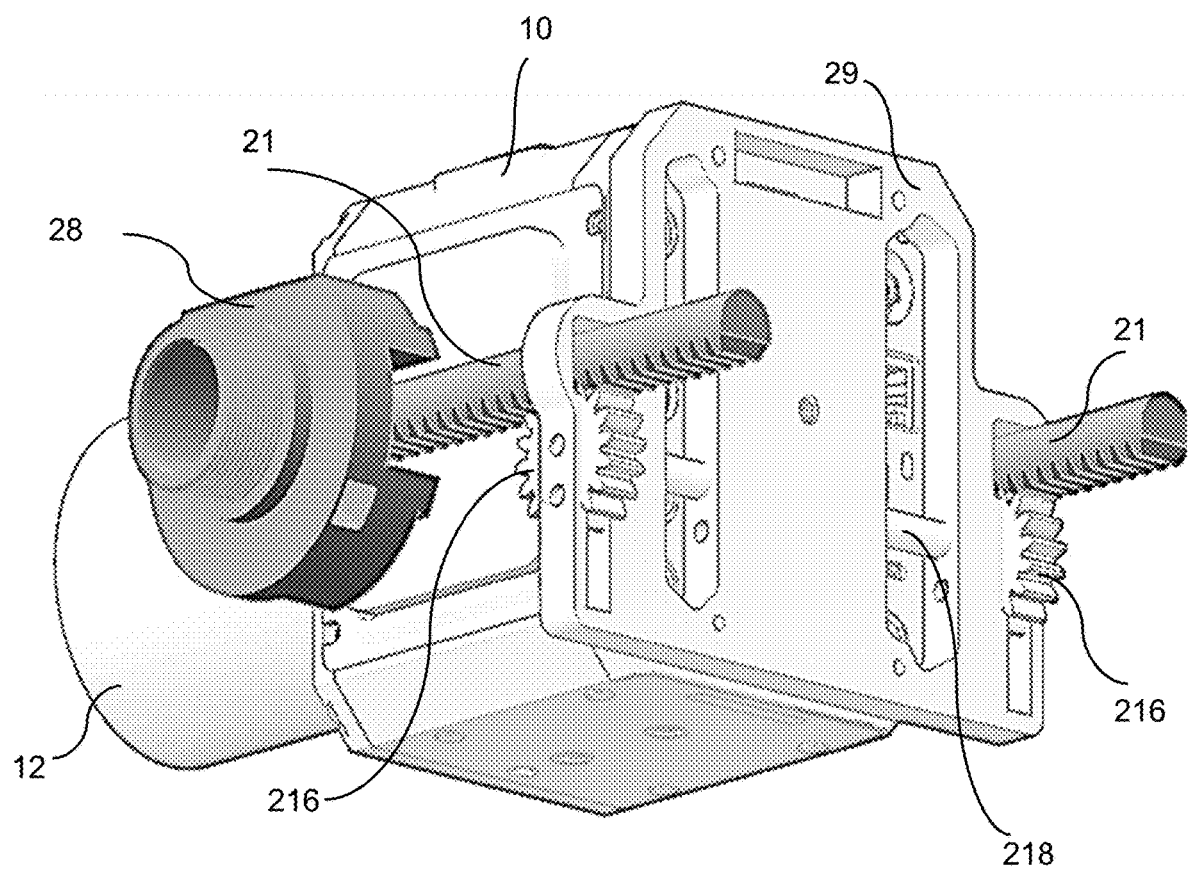
FIG. 4 is a rear perspective view of the camera and rack-and-pinion mechanism according to an embodiment of the camera system.

FIG. 4 illustrates greater detail for the rack assembly. Pinion gears 216, rotatably mounted to backplate 29, engage with their corresponding racks 21, which are attached via housings 28, respectively, to motor 24 on the right and bearing 25 on the left of the camera. In this view, side plates are not shown attached to each side of camera 10. Rather, the back plate 29 can attached to the camera back using the standard built-in threaded bores if available. If no threaded bores are provided in the camera back, a U-shaped bracket that wraps around the back and sides of the camera may be used to attach the z-axis motion assembly via the side mounting holes of the camera.

The dual rack-and-pinion assembly allows for quick, precise z-axis adjustment. Pinions 216 are synchronized via a shaft 218 that ensures the camera stays perfectly aligned across the dual racks and does not skew when adjusting. For adjustment, shaft 218 and pinions 216 can be turned manually or, in some embodiments, may include a pinion motor, which would be located on backplate 28 to drive rotation of the shaft 218 and/or pinions. In motorized implementations, the motor may be driven by a controller tied to a camera Inertial Measurement Unit (IMU) that allows for automatic balancing. The IMU may incorporate a gyroscope, accelerometer, magnetometer, or any combination thereof. The IMU may be mounted parallel to the camera and to measure camera tilt, roll, yaw, and speed of movement, providing that information to the system controller for processing. The controller may automatically determine adjustments if needed, or it may display parameters to allow the system operator to make adjustments either manually, or by sending commands through the controller to the motors to implement the desired adjustments.

In an alternative embodiment, each rack-and-pinion assembly may be replaced with a screw-drive assembly that is attached to both sides of the camera via side brackets similar to those described for the rack-and-pinion assembly. Drive motors for the screw drive would be synchronized for simultaneous activation for z-axis adjustment.

An important feature of the improved gimbal is that it distributes the gimbal components' weight evenly across the vertical plane. This begins with a symmetrical configuration of U-arm 22, which ensures the camera payload is always evenly spaced between the two arms and always centered on the roll motor 220. The gimbal tilt motor 24, which is the heaviest component, is counterbalanced on opposite side of the arm with a ball bearing 25, IMU, wiring, lens servos, and other gimbals components. Either the Bearing Side of the U-arm or Z-axis adjustment assembly can be fine-tuned for balance with small counter-balance weights if necessary.

Referring to FIGS. 3B and 3C, the base of roll motor 220 is attached to blocks 222 so that activation of motor 220 rotates U-arm 22 relative to block 222. The symmetrical positioning of motor 220 between the blocks further contributes to centering of the gimbal around axis 112. Each block 222 is connected to the upper end of a corresponding elbow 224 by rod 223. Rod 228 connect the lower end of elbow 224 to a block attached to yaw motor 230, which provides for panning of the camera. While not shown in these figures, yaw motor 230 will be attached to a base or other structure, for example, via a secure screw-type or other conventional connector. The base may house, or be attached to a housing that encloses, a gimbal control card with circuitry for connection to the various electrical components of the 3-axis gimbal. Alternatively, the gimbal control card may be located in a housing on the for yaw motor housing 230, between rods 228 (for balance). The same structure may serve to house the system controller 30, or, in some embodiments, the system controller may be retained in a housing attached to blocks within the gimbal assembly. For example, system controller 30 may be supported on the rear of the yaw/roll arms of the gimbal assembly, i.e., at blocks 222-224. The symmetrical and balanced gimbal design means that when a camera is first mounted, the lens changed, or other component is added or subtracted, optimal balance can be achieved in seconds rather than minutes. Each motor within the gimbal provides feedback signals that are provided to the control module to indicate its position.

Figure 5:
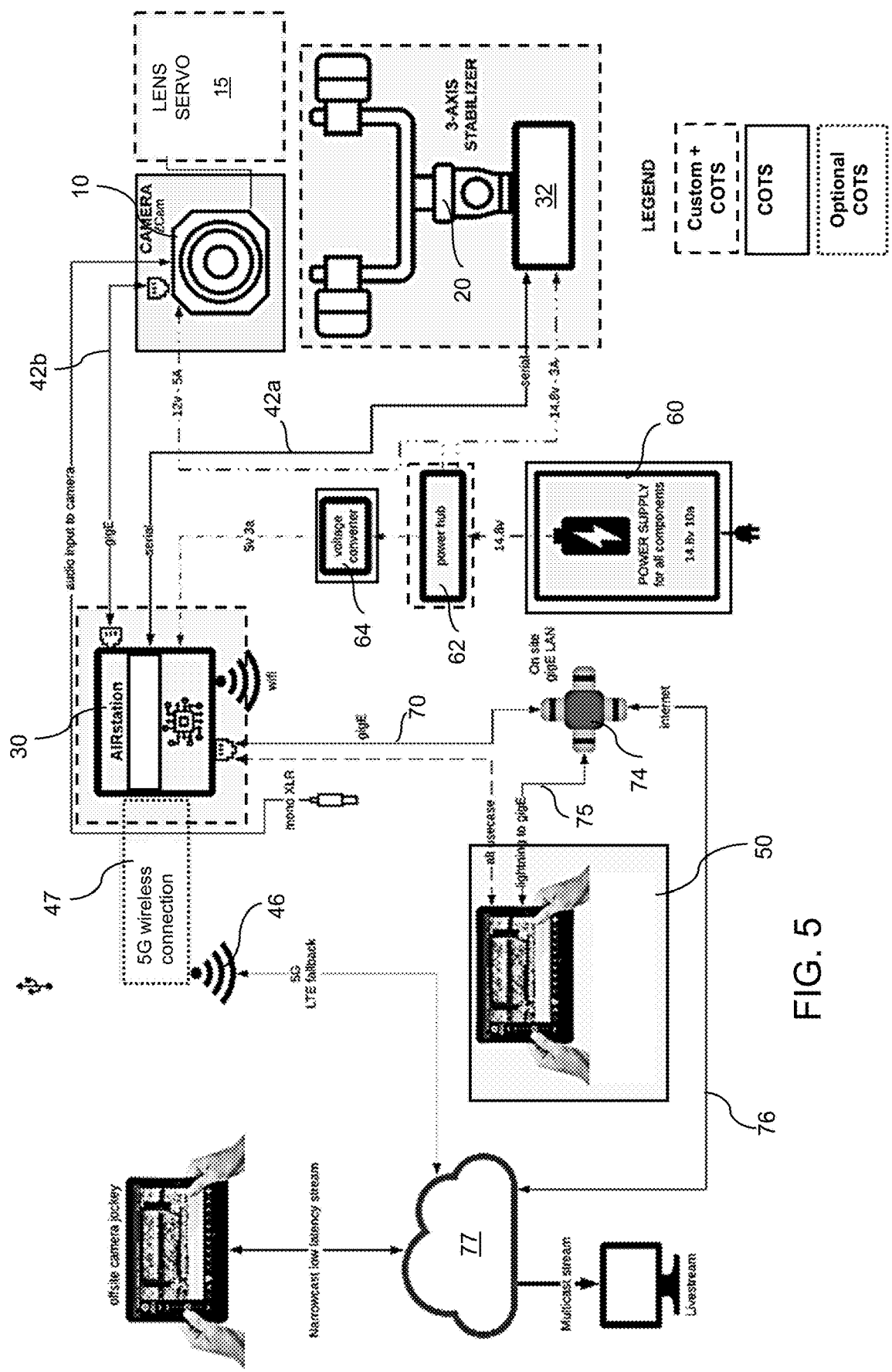
FIG. 5 is a diagram of the integrated communication among the different components of the camera system according to an embodiment of the invention.

FIG. 5 illustrates the components of an embodiment of the inventive system and their interconnections. The system can be constructed using a variety of different components and sources. The legend at the lower right corner of the figure indicates sample sourcing for the components, which includes commercial off-the-shelf ("COTS"), custom, and combinations thereof. As described above, the primary components of the inventive system are a high resolution camera 10, a 3-axis gimbal 20, a control module 30, camera platform 40, and a user interface 50. Camera 10 is connected to control module 30, also referred to as the "AIRstation", via an electrical interface cable 42b. In the preferred embodiment cable 42b is a Gigabit Ethernet (GigE) cable, a digital interface for digital cameras that is widely used in the field of industrial image processing. Cameras contemplated for use with the inventive system typically include standard industry standard GigE ports, as previously described. For cameras that do not have built-in (native) lens servos, additional lens servo capability 15 may be added and connected to camera 10 via the camera's built in 4-pin RS232 port or controlled directly from the AIRstation. As will be apparent to those of skill in the art, as new industry standards are adopted, additional interface capability may be provided. Accordingly, description of specific industry standards within the exemplary embodiments is not intended to be limiting.

Camera 10 is mounted on gimbal 20 as previously described. Gimbal 20 is electronically, and in most cases physically, attached to gimbal control module 32 which may be located within a common housing with AIRstation 30 and connected via a serial connector 42a. AIRstation 30 functions as an Ethernet distribution point, Ethernet to serial control bridge(s), and power distribution to all system components. As illustrated, power connections are shown as dash-dot lines with connections between power supply 60, which provides power to all system components. In the exemplary embodiment, power supply 60 is a 14.8V, 10 amp supply connected via cable, e.g., cable 42 in FIG. 1, to power hub 62, which may be housed within the AIRstation housing for connection to gimbal module 32 (14.8V, 3 amp) and camera 10 (12V, 5 A) and to voltage converter 64, which provides 5V, 3 amps to AIRstation 30. In some embodiments, the AIRstation is preferably contained within a watertight housing, which that can serve as a physical base to the gimbal, and is attached to camera platform by, for example, a secure screw-type connection. AIRstation 30 is wired via GigE cable 70 to an Ethernet LAN switch 74 which provides connection to a network or storage device or database. As illustrated, interne connection 76 to cloud 77 supports provides large capacity cloud-based data storage, plus access for video editing, video switching, multicasting and livestreaming to other devices.

For purposes of the present description, a storage device, a database, and cloud storage are all fall within the meaning of a "storage medium." The user interface 50 may be a tablet/computer that can be operated via touchscreen, user voice audio, and/or an external accessory control device. The tablet/computer control connection can be either direct point-to-point or networked via a Local Area Network (LAN), Wide Area Network (WAN), or wireless (e.g., WiFi or cellular) connection. For wired connection, alternatives include serial or parallel control (digital or analog) and/or high-speed mixed signal. In the exemplary embodiment, Ethernet switch 74 provides connection to user interface 50. For example, if the user interface is an Apple® iPad®, cable 75 may be a Lightning® to GigE cable. For other tablet brands, e.g., Samsung® or Microsoft®, a USB-C to GigE cable can be used for LAN connection to switch 74. Where wireless communication is used, e.g., 5G or other cellular network, AIRstation 30 can be configured via a Sim card or other add-on module 47. This configuration would provide a direct connectivity to the cloud 77. In a preferred embodiment, the AIRstation is configured for both local (e.g., wired) and remote connectivity. For local (on-premises) connection, the application can be connected to the AIRstation over LAN via Wi-Fi or other mobile camera platform to control the camera, gimbal and, if applicable, the robotic arm. For remote connectivity, the application can connect via a VPN into the local network or directly to the AIRstation via a carrier's IP address. This way, all connections would be secure and no unauthenticated access is permitted. To further reduce latency, which is inherent in all VPN implementations, a Websockets-based cloud gateway can also be used as a central aggregation point to send real-time control and telemetry data to/from the AIRstation to the operator.

As will be readily apparent to those of skill in the art, user interface 50 is not limited to a tablet or other touchscreen device. In some implementations, a tablet, laptop, or desktop computer may provide the visual display which controls are effected by way of a keyboard, joystick, game controller, trackball, mouse, touchpad, or some combination thereof. In other embodiments, an augmented reality (AR) or virtual reality (VR) headset can be implemented for gyroscopic and/or accelerometer control of the pan/tilt/roll functions of the gimbal.

Figure 6:
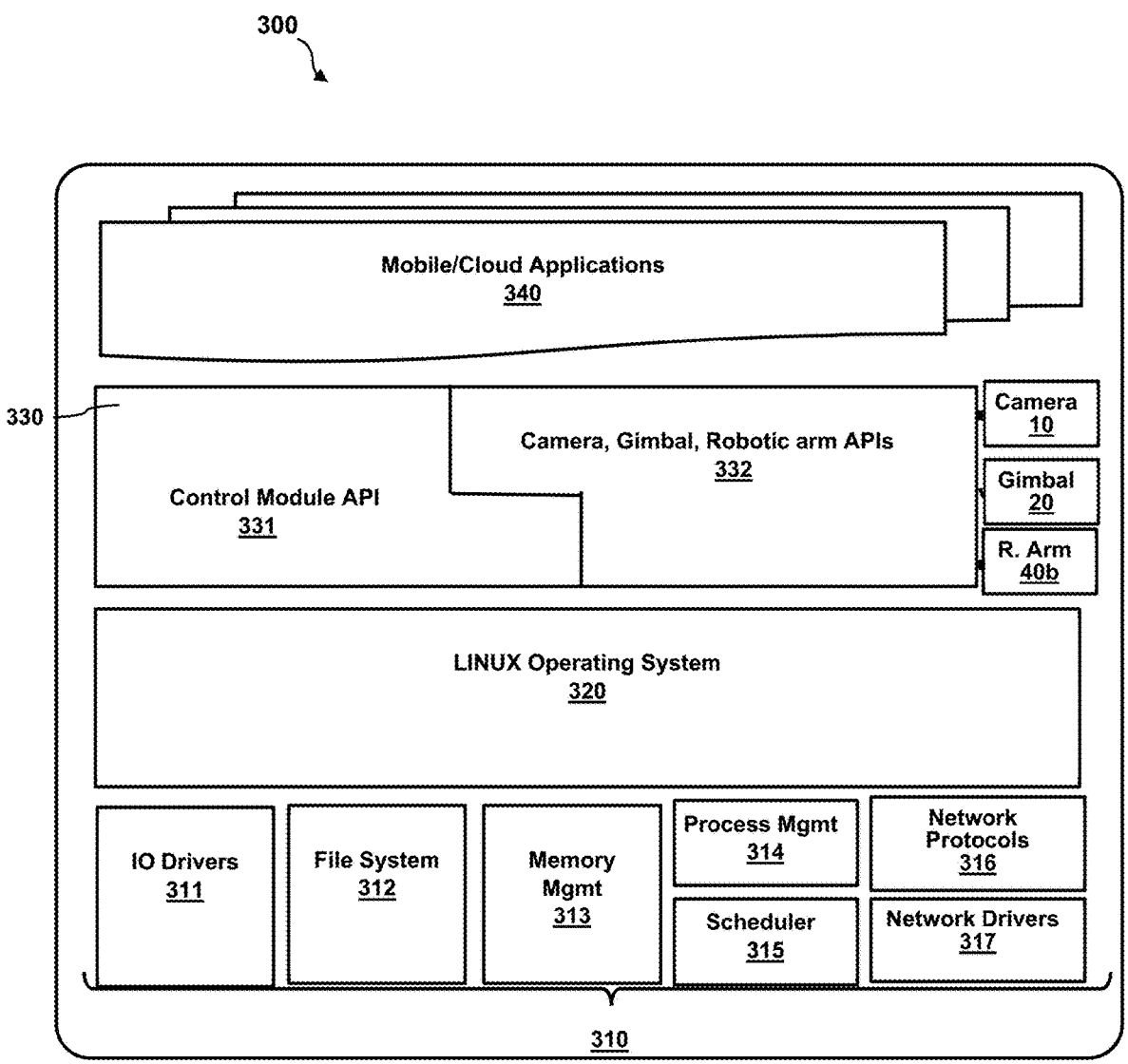
FIG. 6 is a platform stack showing an exemplary architecture of the AIRstation control module.

In the exemplary embodiment, AIRstation 30 is implemented using a Raspberry Pi 4 computer. As will be apparent to those in the art, other CPUs may be used, including, but not limited to NVIDIA® Jetson™ or Qualcomm® Snapdragon™ 865 or 888. The AIRstation API is built on a secure and lightweight IoT protocols such as Websockets, MQTT (Message Queuing Telemetry Transport) and REST (Representational state transfer). FIG. 6 illustrates a platform stack 300 for an exemplary architecture for supporting the AIRstation application. Firmware level 310 includes interfaces for connection between the AIRstation and other system hardware components as well as communication with an external network, such as IO drivers 311, file system 312, memory management 313, process management 314, scheduler 315, network protocols 316 and network drivers 317. Service level 320 includes the operating system, which in the exemplary embodiment, is a Linux operating system. There are multiple Linux operating systems available for the Raspberry Pi computers including Raspberry Pi OS, Ubuntu, and others. Selection of an appropriate OS for the selected CPU will be within the level of skill in the art. This level provides the programs running in the application level with basic interaction with the hardware. Application level 330 integrates the logic and interfaces required to coordinate operations among the system components with two API blocks: control module API 331 and component APIs 332. As shown, component APIs are provided for operation of the camera 10, the gimbal 20 and, optionally, for a robotic arm 40b. Communication level 340 includes the applications for interacting with an external network, i.e., the internet and/or cloud.

The AIRstation control module software implementation allows for integrated visual (in addition to numerical) programming of camera, lens zoom, focus, and aperture control, pan/tilt positioning, and camera X/Y/Z position in 3D space. All camera and lens settings as well camera position and direction in 3D space is set via a simple What-You-See-Is-What-You-Get (WYSIWYG) interface. Set positions can be recalled and smoothly transitioned between with a simple tap. Multiple settings can be transitioned between simultaneously (e.g., pan and tilt direction and camera zoom and focus can all happen simultaneously). The touchscreen of user interface 50 provides user controls for pan, tilt, zoom, focus, aperture, audio levels, camera settings, streaming destination and more.

Figure 7:
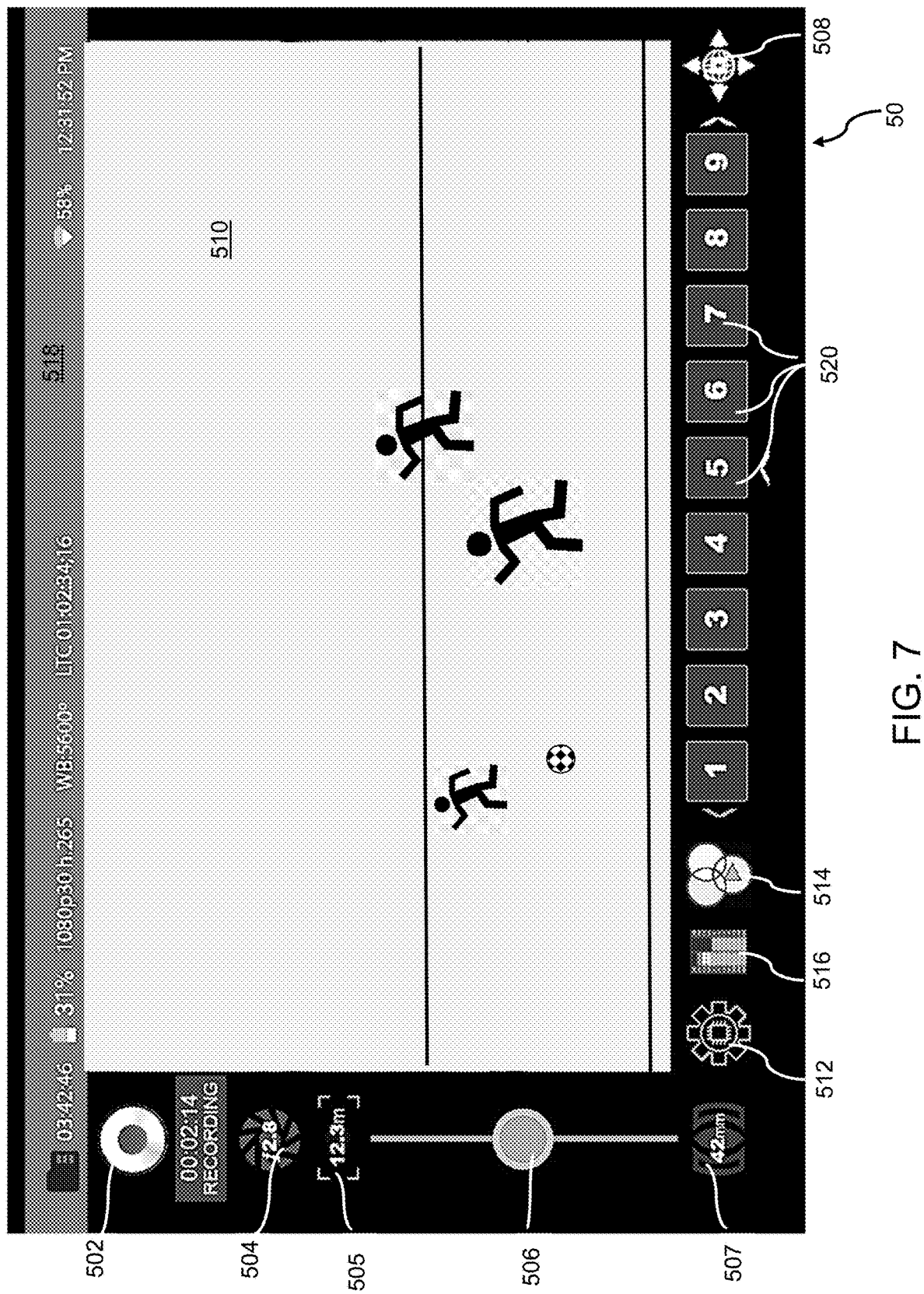
FIG. 7 is a simulated screen display of a user interface according to an embodiment of the inventive camera system.

FIG. 7 illustrates an example of a display on the user interface 50 according to an embodiment of the inventive system. The display includes user-selectable "buttons" for initiating a number of different actions. Table 1 below provides a list of the features that can be controlled through user interface 50.

TABLE 1

| Feature | Function |
| --- | --- |
| record button 502 | start/stop recording; activates display of time and other status in top bar 518 |
| aperture 504 | displays current aperture (exposure) setting |
| focus 505 | displays current focal distance |
| zoom/focus/exposure | manual control of zoom, focus and exposure by |
| slider 506 | selecting aperture, focus or zoom values, then dragging slider |
| zoom 507 | displays current zoom setting |
| top bar 518 | displays recording time, battery level, recording format (resolution, frame rate, codec), white balance, and other image parameters; remote signal level and time of day |
| gimbal control 508 | toggles to adjust gimbal pan/tilt/roll; locks gimbal; includes ability to select mimicking of tablet movement |
| function select 512 | displays a menu with different options for diverse features, such as livestreaming the video, automatic tracking of objects, quick set profiles, and custom-programmed functions |
| overlays 514 | provides selection of different video overlays and look-up tables (LUTs) for color grading and conversion profiles |
| audio button/level 516 | provides a readout of detected audio levels; allows manual adjustment or on/off. |
| call (recall) buttons 520 | activates pre-programmed settings for gimbal and camera control; allows transition control for pre-programmed parameters |

Additional control features can be enabled by touching an area of the image 510 and dragging their finger (or a stylus), the user can control camera pan and tilt. For example, to follow a player of the ball in the field of play, the user touches the images where the player/ball is and follows its movement of the player/ball with the finger or stylus. Automatic exposure control may be activated through multiple taps on the image to display a temporary icon for changing aperture setting 504 using the camera's automatic settings. Similarly, automatic focus can be selected by multiple taps on a selected spot on the image 510.

Existing methods of displaying video exposure values involve zebra stripes for specific values (e.g., over 90IRE) or False Color where specific IRE values are displayed in different colors or waveform/vectroscopes that display luminance/color values as curves. These methods are difficult to correlate with portions of the video picture area (waveforms). They can also be highly distracting (zebras, false color overlays) when the user is concentrating on the subject or action being recorded. These features also tend to involve intensive computational and video display resources.

The inventive approach avoids such problems by providing a temporary display of spot exposure value. To activate this feature, the camera operator simply touches an area of the screen to display an IRE value from 0-100 to help determine proper exposure level.

The inventive approach provides a fast, non-intrusive method for displaying exposure value to help camera operators capture properly exposed video.

Existing methods of enlarging a video image to check focus accuracy involve either physically zooming in the lens or digitally zooming in the picture area. The physical zoom method has the drawback of changing the video image being recorded so it is not possible to utilize while recording is in progress. As a result, the focus check must be performed beforehand. Other approaches that employ a digital enlargement method leave the recording output unchanged while increasing the size of the entire picture frame, which crops out areas that may be of interest.

The inventive system temporarily enlarges only an identified portion of the image, leaving the recorded image unchanged and without cropping out other possible areas of interest.

In some embodiments, a smart focal length feature can be included for pan/tilt/roll control. The longer the focal length of a camera lens, the narrower the angle of view. At a narrower angle of view camera movement is visually amplified, e.g., when shooting with 300 mm lens (8° Angle of View), a 1° movement instruction creates more apparent visual movement than when that same instruction is sent to a camera equipped with a 12 mm lens (122° Angle of View). Because existing control devices (control surface, joystick or other device) use a static control signal to pan/tilt, smooth control at longer focal length lenses can be a challenge. This is further complicated when a camera equipped with a variable zoom lens is executing a live-recorded zoom. The apparent movement is amplified as the lens zooms makes precise control more difficult.

The inventive system addresses these challenges using a proportional control approach. The more zoomed in the lens becomes, the more controller travel is required for the same degree of movement. For example, a lens at 25 mm requires 5 mm of touchscreen movement from point of origin to move the camera 10° per second, while for a lens at 50 mm, that same 5 mm of movement will cause the camera to pan at 5° per second.

The inventive approach dynamically changes the degree of camera movement to compensate for the ""long lens effect"" irrespective of the control device (touchscreen, joystick, AR headset, etc.). This implementation involves control module 30 obtaining lens focal length information from the lens and then interpolating the data to dynamically change the degree of pan/tilt/roll travel appropriate for the focal length. The amount of camera pan/tilt/roll travel is dynamically adjusted downward for any given control input as the lens focal length increases.

In some embodiments, software-based "bumpers" may be included to temper extreme movements of camera and lens. The software implementation provides for camera lens zoom, focus, and aperture control as well as camera movement. A "delta" can be set for each point controlling the amount and speed of Ease-in and Ease-out allowing for smooth dynamic ramping transitions between two different settings, providing, in effect, a "more-human less-robotic" camera movement control. Settings for these features can be implemented by programming of the call (recall) buttons 520 and selecting the corresponding call button when the feature is to be activated. A software implementation also provides a microprocessor-assisted dampening to prevent runaway or overly rapid manual camera/lens movements. The degree of dampening can be variable and controlled by a user setting.

Manual control of transition(s) between two preset positions may be included. (In this context, "position" means the location of any system component that is moveable, i.e., the camera, the lens, the gimbal, or the platform.) The AIRstation's software implementation allows for variable speed manually controlled transitions on the fly between multiple preset points. For example, a starting point "A" and an ending point "B" can be set. Various "waypoints" can also be added in between the start and end points. A start/end/way point may include any or all of the camera, lens, gimbal, or camera platform settings.

Figure 8:
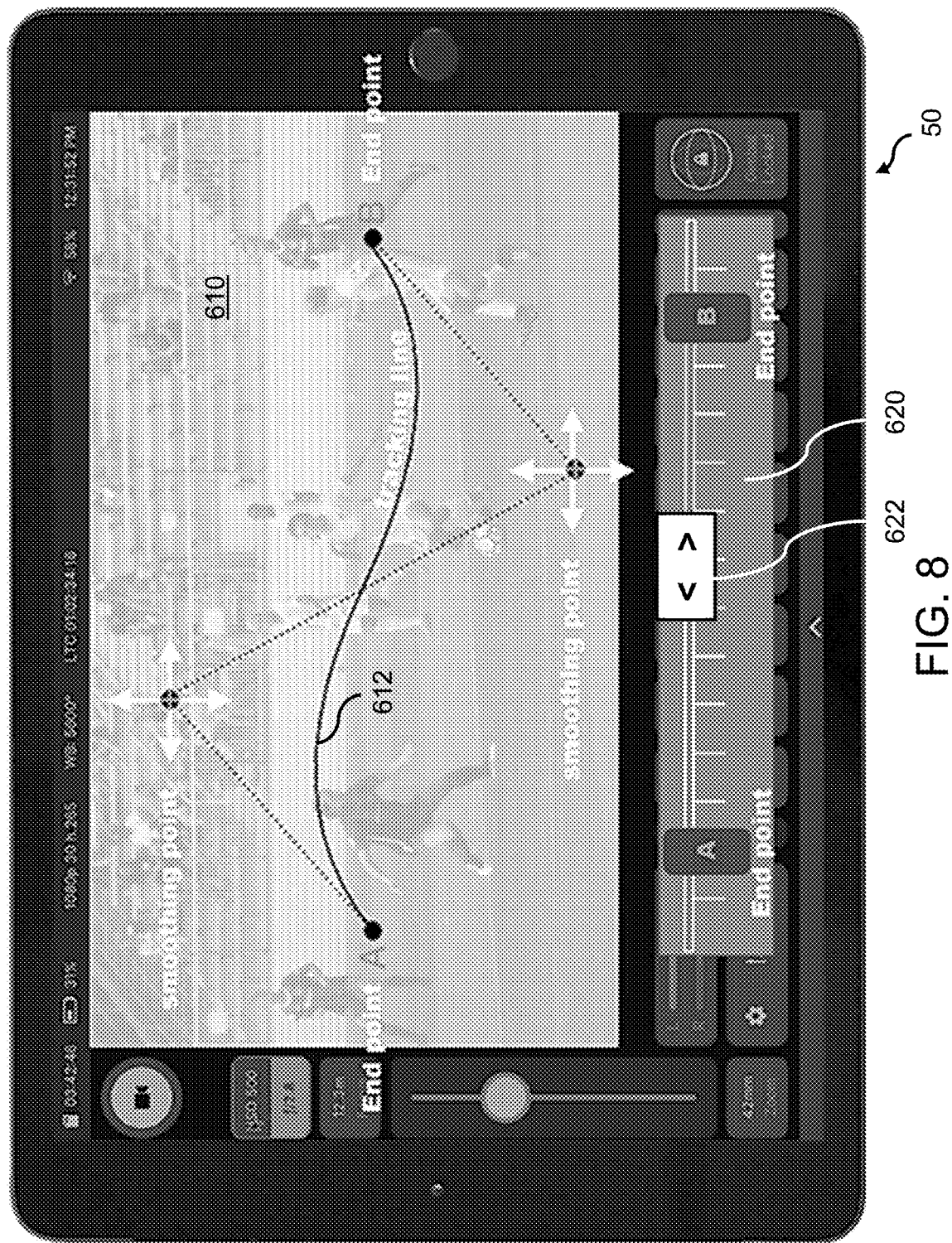
FIG. 8 is a simulated screen display of a user interface showing a smoothing feature for tracking motion.

FIG. 8 provides an example of the system's WYSIWYG smoothing of programmed movement for trajectory planning. The system software can generate an overlay 610 with a visual motion path on the video display. Camera movement is mapped as a tracking line 612 onto picture area. The end points ("A" and "B") of the tracking line are marked on slider bar 620. By sliding manual slider button 622 along slider bar 620 between the points, the user can manually control the speed of the overall movement between those fixed points rather than relying on whatever speed was preprogrammed. Keyframe points can be set and/or modified to smooth mimicked or preset movement points. Similar procedures exist for motion graphics in post-production but have not generally been available for live recording.

Adjustment points can be added to a path, allowing for movement curves to be modified and smoothed, e.g., quadratic Bezier curves as are well known in the field of computer graphics. In the recording and camera movement, there is a requirement for the paths in Cartesian space to be smooth and flowing versus being angular when changing the direction of movement. This approach benefits the control system for both positioning and velocity.

Sharp focus is generally difficult to achieve with any camera lens, particularly with fast moving or dynamic subject matter being captured on video. Manual focusing can be quick but is subject to human error. Automatic focusing systems (a/k/a "autofocus") primarily use contrast based detection methods to calculate the intensity between adjacent pixels on the image sensor to determine focus. While this method is serviceable, it is severely limited by image sensor capabilities. It can be slow, inaccurate, and requires the lens to ""hunt"" to find the proper focus distance. This in-and-out "hunting"" movement of the focal elements causes a distracting and highly undesirable softening/sharpening of the image. Contrast-based autofocus is also particularly unreliable in environments where haze or low light levels obscure the subject.

Focusing difficulty is compounded when using certain lens types. Manufacturers have created ""varifocal"" lenses that are smaller, lighter, and lower cost but with the drawback that they are unable to retain focus as a camera is zoomed. "Parfocal" lenses, on the other hand, do retain focus while zooming but they are generally larger, heavier and more expensive. Varifocal lenses can produce optical quality equal to or better than their parafocal counterparts. If the varifocal focusing limitations can be overcome, they can be deployed in a much wider number of use cases.

Figure 9:
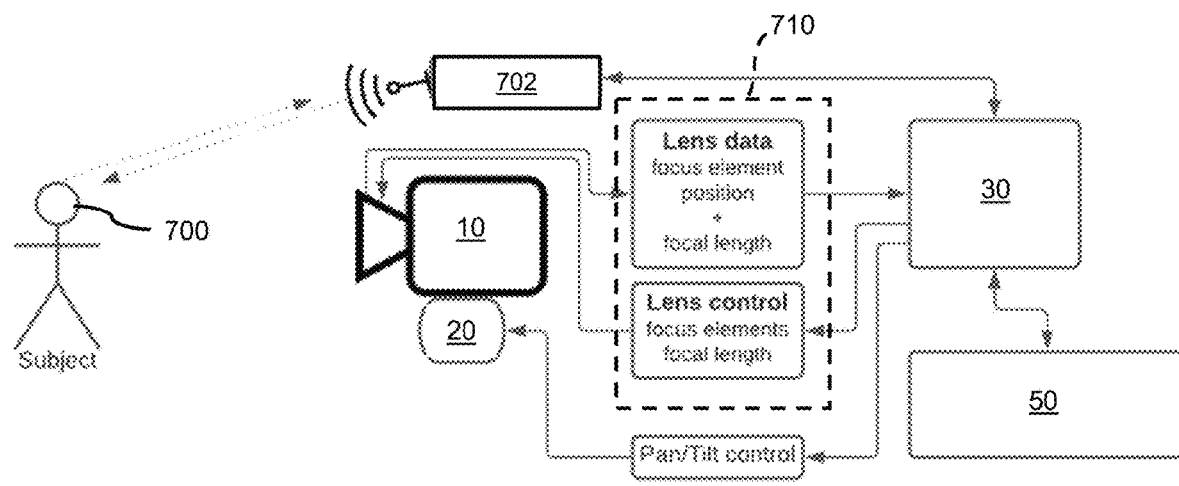
FIG. 9 is a block diagram of an embodiment of the inventive camera system incorporating one or more depth sensors.

In some embodiments, the inventive system employs a depth sensor such as LIDAR, radar, sonar, laser, or other distance sensor to generate a signal for use by the AIRstation control module to determine distance of a subject from camera and, using the measured distance, achieve precise focus on all lens types. This approach enables varifocal lenses to behave as if they were parfocal, retaining focus while zooming. The AIRstation control module also has the advantage of being controllable over IP, enabling secure lens focus and tracking control at remote distance. Referring to FIG. 9, a user identifies the area of interest (""AoI"") on a touchscreen interface 50. That AoI 700 is conveyed to the AIRstation 30 and then correlated with depth information provided by one or more depth sensor module(s) 702 to determine the precise distance of the AoI-subject 700 to the camera sensor focal plane. When using a parfocal lens, AIRstation 30 sends that distance information directly to lens focus control motors to quickly and precisely establish the desired focus distance setting.

For varifocal lenses, because the lens focus elements position varies by zoom focal length, a pre-calibrated "lens profile" is needed to adjust the lens focal elements to the proper position for any given zoom focal length. The AIRstation 30 creates a closed loop communication loop 710 with the lens and camera to dynamically adjust the lens focus elements to the proper position for any given zoom focal length enabling a varifocal lens to function parfocally, retaining focus while zooming.

It should be noted that some manufacturers, e.g., Sony, have integrated lens profiles into their camera bodies. These profiles are proprietary systems that do not allow for use on other camera systems. The inventive system provides the advantage of allowing programmable lens profiles to be created for any varifocal lens from any manufacturer as well as allowing for precise calibration of each individual lens, irrespective of manufacturer, thus enabling any varifocal lens to be used on any camera body capable of system integration.

The incorporation of distance measurement capability via LIDAR, radar, sonar, laser, or other depth sensor into the inventive system can also assist with tracking. In the same way the AIRstation control module can utilize AoI information for focus, the integration of depth information with image recognition allows more precise object tracking to be achieved. This can be replaced or enhanced by the use of radar for moving objects or ultrawideband for positioning via radio beacons. The benefit and utility of using multiple modalities for position information is in the reduction of single-point-of-failure scenarios. For example, LIDAR is based on the return time of a scanning laser so anything that obscures or blocks the path of the emitted or returning laser scan can cause it to yield inaccurate or incomplete information. Ultrawideband is not challenged by visibility but does have a weakness in that there must be a clear line of sight between the radio tag and at least three beacons. Radar does not have any of the aforementioned weaknesses, but does require complex algorithms (such as Fast Fourier Transforms) to process the reflected signal back to the emitter. Accordingly, combination of different sensors will yield the most accurate and reliable results.

Most commercial video cameras generate large amounts of metadata, only a fraction of which is generally used. Apart from the most rudimentary information, this metadata is discarded or ignored in video post-production applications, which is largely due to its static nature. Video is a dynamic medium with the information changing every few milliseconds. Thus, it is only marginally useful to have static data for dynamic medium.

Figure 10:
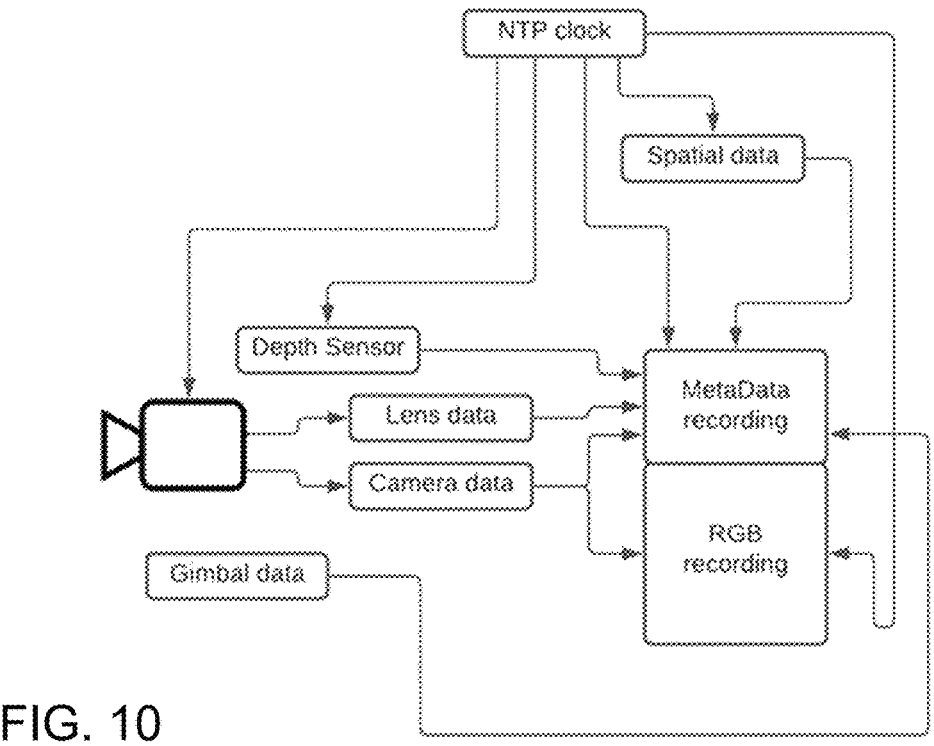
FIG. 10 is a block diagram of an embodiment of the inventive system configured for metadata recording.

The inventive system exploits the camera's standard metadata and generates additional metadata through the use of added distance sensors to greatly expand capabilities for video post-production and file indexing. FIG. 10. is a block diagram showing the various system components from which metadata can be collected and compiled in the system's memory (within control module 30) and transmitted to the cloud (see, e.g., FIG. 5) or other database for storage. Specifically, the system's time-stamped frame-accurate dynamic-metadata recording is added to the traditional static metadata. Recorded information can include lens data, focal length, focus distance, and aperture. Static camera data may also include tint, flicker reduction, shutter angle/speed, image profile, sharpness, brightness, saturation, contrast, luminance, LUT, and audio input source. Dynamic camera data may include white balance, ISO, and audio level. Gimbal data includes IMU information, gyro heading, speed of movement, pan degrees, tilt degrees, roll degrees, motor encoder, etc. Position/Depth data include information about the camera's position in 3D space and depth map corresponding to RGB information.

Data from one or more depth sensors may be utilized to construct a 3-D depth map. In one illustrative example, millimeter wave radar has sufficiently high level resolution to allow assignment of a depth value for each pixel in the image to generate a depth map. This facilitates separation of the foreground from the background to significantly expand the ability to modify videos via post-production editing, for example, adding video effects, background replacement, removal of unwanted objects, additional of objects, etc.

Optional additional features of the inventive system may include a transceiver system with a separate distance transmitter to provide focus assist and pan/tilt control. In one example, a dog tag-like necklace or other transmitter may be worn by subject to transmit distance and/or direction data to a receiver that has been calibrated with camera focal plane. The camera can then use that data to precisely adjust focal distance. In another example, the transceiver may be incorporated into a Fitbit® or Apple® watch-type personal smart device, or an application may be included in the system software to communicate with the built-in tracking functions, e.g., GPS capability, of such devices. Similarly, a smart phone may be used as the transceiver-tracking device for providing feedback to control focus, zoom, pan and/or tilt. For added interest, trackers or sensors may be incorporated into game balls to allow the system to follow ball movement automatically with the camera, adjusting focus/zoom/pan/tilt as appropriate based on the detected signal(s). Additional focus assist and zoom/pan/tilt control can be implemented via different voice-activated approaches. Tracking allows for the implementation of "follow-me" capabilities by relaying the tracked position back to the AIRStation by providing a 3-dimensional cartesian coordinate position (x,y, depth). The AIRStation uses the x,y coordinate information for controlling the gimbal motors (left, right, up, down). The AIRStation also uses the tracked object information to send focus and zoom information to a connected camera. The combination of the gimbal and camera allows for fully autonomous camera operation.

The inventive camera system disclosed herein provides microprocessor-assisted remote control for precise repeatable camera movement that heretofore has been difficult or impossible to accomplish using existing approaches. The greatly improved stability of the gimbal design allows a lightweight large sensor camera to be placed almost anywhere and smoothly controlled remotely via a simple touchscreen interface. All camera and lens parameters can be set and recalled, and movement smoothed/improved via electronic microprocessor control. Data generated by the system provides expanded post-production capabilities. The inventive robotic camera effectively allows an amateur to shoot like a professional, and a professional to increase the versatility of the video during capture and in post-production editing.

The invention claimed is:

1. A remote control camera system comprising:
 a camera configured for generating digital images and data corresponding to image-related parameters detected by sensors associated with the camera;
 a lens mounted on the camera;
 a 3-axis gimbal configured for supporting and modifying one or more of pan, tilt and roll of the camera, the gimbal comprising a U-arm having arm ends configured to symmetrically support and center the camera between the arm ends and a z-axis motion assembly mounted on opposite sides of the camera, the z-axis motion assembly configured to provide forward/backward adjustment of a center of balance of the camera and the lens;
 a camera platform configured for supporting the gimbal;
 a control module configured for receiving the digital images and image-related parameters generated by the camera, for processing the image-related parameters to generate image information associated with the digital images, and for generating control signals to each of the camera and gimbal;
 a communications path; and
 a user interface in communication with the control module via the communications path, the user interface configured for displaying the digital images and the image information associated with the digital images, and for entry of user commands for causing the control module to activate control signals to execute operations of one or more of the camera and the gimbal.

2. The system of claim 1, wherein the camera platform comprises one or more of a tripod, a monopod, a slider, a jib arm, a robotic arm, a ground-based vehicle and a wall mount.

3. The system of claim 2, wherein the camera platform comprises a robotic arm, and wherein the control module is further configured to generate control signals for manipulation of the robotic arm.

4. The system of claim 2, wherein the camera platform comprises a ground-based vehicle, and wherein the control module is further configured to generate control signals for manipulation of the ground-based vehicle.

5. The system of claim 1, wherein the communications path is a wireless or wired connection path.

6. The system of claim 1, wherein the gimbal comprises a z-axis motion assembly, wherein activation of the z-axis motion assembly provides forward/backward adjustment of a combination of the camera and lens.

7. The system of claim 6, wherein the z-axis motion assembly comprises a dual rack—and gear assembly, wherein a gear of each rack—and gear assembly is disposed on each of a left side and a right side of the camera.

8. The system of claim 7, wherein a rack of each rack—and-gear assembly is supported on the arm ends of the U-arm assembly.

9. The system of claim 1, wherein a first end of the U-arm assembly comprises a tilt motor and a second end of the U-arm assembly comprises a bearing, wherein activation of the tilt motor tilts the camera relative to the U-arm assembly.

10. The system of claim 1, wherein a base of the U-arm assembly comprises a roll motor.

11. The system of claim 1, wherein the image information associated with the digital images comprises one or a combination of lens data, focal length, focus distance, exposure, aperture, tint, flicker reduction, shutter angle/speed, image profile, sharpness, brightness, saturation, contrast, luminance, LUT, white balance, ISO, and audio level, and wherein the control module is configured to:
  generate an interactive display of the image information on the user interface; and
  in response to entry of user commands via the user interface, activate control signals to execute operations of one or more of the camera and the gimbal to adjust one or more of the image-related parameters.

12. The system of claim 11, wherein the control module is further configured to a network for communicating the digital images and image information to a storage medium.

13. The system of claim 1, wherein the gimbal is further configured to generate signals corresponding to gimbal-related parameters, and wherein the control module is further configured to receive the gimbal-related parameters and associate the gimbal-related parameters with the image information.

14. The system of claim 1, further comprising one or more depth sensors configured for determining a distance between a subject of interest and a focal plane of the camera and generating a depth signal, wherein the control module receives and processes the depth signal to generate depth information associated with the image information.

15. The system of claim 14, wherein the depth information is processed by the control module to generate tracking commands to one or more of the camera, lens, and gimbal to track motion of the subject of interest.

16. The system of claim 14, wherein the depth information is processed by the control module to generate a depth map from the digital image.

17. The system of claim 1, wherein the control module is further configured to control movement of the camera and gimbal to smooth transitions between two different points within a field of view.

18. The system of claim 1, wherein the control module is further configured to obtain lens focal length information from the camera to dynamically change a degree of pan/tilt/roll travel based upon the focal length.

19. The system of claim 1, wherein the user interface comprises a touchscreen device, and wherein the user controls camera pan and tilt by touching a portion of the image at which a subject of interest is located and following movement of the subject of interest.

20. The system of claim 1, further comprising a transmitter/receiver system, wherein a transmitter disposed on a subject of interest generates a signal to the control module to provide depth information to assist with focus and pan/tilt control.

* * * * *